United States Patent [19]
Lapergue et al.

[11] Patent Number: 5,676,312
[45] Date of Patent: Oct. 14, 1997

[54] SEAL FOR A VARIABLE GEOMETRY NOZZLE

[75] Inventors: Guy jean-Louis Lapergue, Rubelles; Claude Lejars, Draveil, both of France

[73] Assignee: Societe National d'Etude et de Construction de Moteurs d'Aviation (S.N.E.C.M.A.), Paris, France

[21] Appl. No.: 516,827

[22] Filed: Aug. 18, 1995

[30] Foreign Application Priority Data

Aug. 18, 1994 [FR] France ................... 94 10103

[51] Int. Cl.$^6$ ................... B63H 11/10
[52] U.S. Cl. ................... 239/265.19; 239/265.33; 239/265.35
[58] Field of Search ................... 239/265.39, 265.33, 239/265.35, 265.37, 265.41; 60/228, 230, 232

[56] References Cited

U.S. PATENT DOCUMENTS

| | | |
|---|---|---|
| 2,984,068 | 6/1961 | Eatock . |
| 2,989,845 | 6/1961 | Howald ................... 239/265.41 |
| 3,612,106 | 10/1971 | Camboulives . |
| 3,954,225 | 5/1976 | Camboulives et al. ................... 239/265.41 |
| 3,972,475 | 8/1976 | Nelson et al. ................... 239/265.41 |
| 4,176,792 | 12/1979 | McCardle, Jr. . |
| 4,196,856 | 4/1980 | James . |
| 4,878,618 | 11/1989 | Hufnagel . |
| 5,215,256 | 6/1993 | Barcza ................... 239/265.39 |
| 5,232,158 | 8/1993 | Barcza ................... 239/265.35 |
| 5,269,467 | 12/1993 | Williams et al. . |
| 5,285,637 | 2/1994 | Barcza ................... 239/265.35 |
| 5,295,645 | 3/1994 | Rozmus ................... 239/265.39 |

FOREIGN PATENT DOCUMENTS

| | | |
|---|---|---|
| 1227966 | 6/1958 | France . |
| 1198435 | 12/1959 | France . |
| 2030532 | 11/1970 | France . |
| 2227433 | 11/1974 | France . |
| 2366454 | 4/1978 | France . |
| 2397534 | 2/1979 | France . |

*Primary Examiner*—Andres Kashnikow
*Assistant Examiner*—Tien Dinh
*Attorney, Agent, or Firm*—Bacon & Thomas

[57] ABSTRACT

A variable geometry exhaust nozzle is disclosed in which the follower flaps of the first, upstream ring of flaps and the second, downstream ring of flaps have a seal to seal the gap between the upstream and downstream follower flaps throughout the range of movement of the variable nozzle flaps. The sealing device has a plate extending between the downstream edge portion of an upstream follower flap and the upstream edge portion of a downstream follower flap and across the entire circumferential width of the flaps. The plate has an upstream portion pivotally connected with the downstream edge portion of the upstream follower flap and a downstream portion which has a bead pivotally contacting an inner surface of the upstream edge portion of a downstream follower flap.

20 Claims, 4 Drawing Sheets

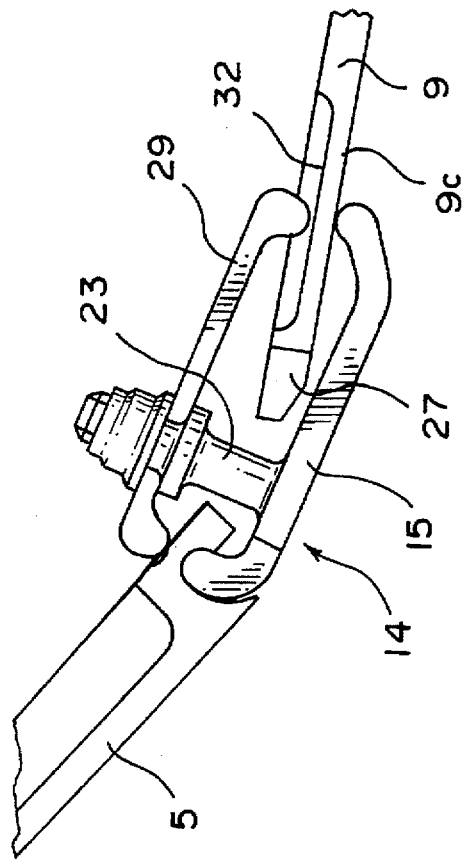

SEAL FOR A VARIABLE GEOMETRY NOZZLE

BACKGROUND OF THE INVENTION

The present invention relates to a variable geometry nozzle having a seal to seal the gap between the upstream and downstream follower flaps in all positions of the nozzle. Such a nozzle finds particular usage on a turbojet engine for an aircraft.

Variable geometry turbojet engine exhaust nozzles are well-known in the art and typically comprise a plurality of flaps that are angularly adjustable with respect to the longitudinal axis of the nozzle. Each flap has an inside surface facing the nozzle axis and an outside surface facing away from the nozzle axis. The flaps are arrayed in two rings extending around the longitudinal axis such that the downstream portions of the nozzle flaps of the first ring are pivotally attached to the upstream portions of the nozzle flaps of the second ring. Thus, such nozzles typically comprise a ring of upstream flaps and a ring of downstream flaps. Each ring of flaps itself comprises a set of external or controlled flaps and a set of inner or follower flaps. The external or controlled flaps are circumferentially spaced apart around the longitudinal axis and an inner, or follower flap extends between circumferentially adjacent external or controlled flaps. Each of the flaps in the upstream ring of flaps is attached to the engine structure, such as an exhaust duct at an upstream end portion. Each follower flap has a portion of its outer surface adjacent to opposite side edges located against the inner surface of the adjacent external or controlled flaps.

In these known designs, the external, or controlled, flaps are controlled by known actuators such that pivoting movement of the controlled flaps is imparted to the follower flaps so as to change the geometry of the nozzle.

The known exhaust nozzles may change from converging-converging configurations used for subsonic aircraft speeds to converging-diverging configurations at supersonic speeds. In addition to changing the configuration, the cross-sectional area of the throat of the nozzle may also be regulated.

One of the main problems encountered by these known nozzles is the proper sealing of the joints between the various flaps, in particular where the two rings of flaps are pivotally attached together at the nozzle throat section. The sealing of the flap at the hinge site of the upstream and downstream ring of flaps is implemented by only the flaps themselves.

French Patent No. 2,227,433 describes an exhaust nozzle wherein upstream and downstream follower flaps are articulated by a hinge extending over the entire circumferential width of the flaps and wherein the controlled flaps of one of the rings have housings near their side edges to receive in a sealing and sliding manner, the hinge ends of the pairs of follower flaps. When the slopes of the flaps are changed, this structure inevitably leaks between the side edges of the downstream ring of flaps because the downstream follower flaps are incapable of axially shifting relative to the upstream follower flaps in a way that would preserve the sealing contact between their side edges over their entire lengths and the inside surfaces of the controlled downstream flaps. Axial play or clearance is provided at the hinge site of the upstream and downstream follower flaps to assure sealing between the controlled and follower flaps of a particular ring. However, leaks occur at the location of the hinge because the play or clearance varies with the nozzle configuration.

French Patent No. 2,366,454 discloses a cross-sectionally variable exhaust gas nozzle having a seal between an upstream flap and a downstream flap which enables the flaps to slide relative to one another as a function of their respective angles. However, this nozzle structure has an overall rectangular cross-section lacking follower flaps.

SUMMARY OF THE INVENTION

A variable geometry exhaust nozzle is disclosed in which the follower flaps of the first, upstream ring of flaps and the second, downstream ring of flaps have a seal to seal the gap between the upstream and downstream follower flaps throughout the range of movement of the variable nozzle flaps. The sealing device has a plate extending between the downstream edge portion of an upstream follower flap and the upstream edge portion of a downstream follower flap and across the entire circumferential width of the flaps. The plate has an upstream portion pivotally connected with the downstream edge portion of the upstream follower flap and a downstream portion which has a bead pivotally contacting an inner surface of the upstream edge portion of a downstream follower flap.

A clamp is attached to the plate and cooperates with the bead on the plate to clamp the upstream edge portion of the downstream follower flap so as to allow relative axial movement between the downstream follower flap and the sealing device as the nozzle changes configurations, without exposing the gap between the upstream and downstream follower flaps.

The present design seals the gap between the upstream and downstream follower flaps at the nozzle throat throughout all configurations of the variable nozzle.

BRIEF DESCRIPTION OF THE DRAWINGS

FIG. 4 is a schematic, cross-sectional view illustrating the positions of the flaps and the sealing device in a converging-diverging configuration of the nozzle.

FIG. 5 is a schematic view similar to FIG. 4, illustrating the positions of the nozzle flaps and the sealing device in a converging-converging configuration of the nozzle.

DETAILED DESCRIPTION OF THE PREFERRED EMBODIMENT

Figure 1:
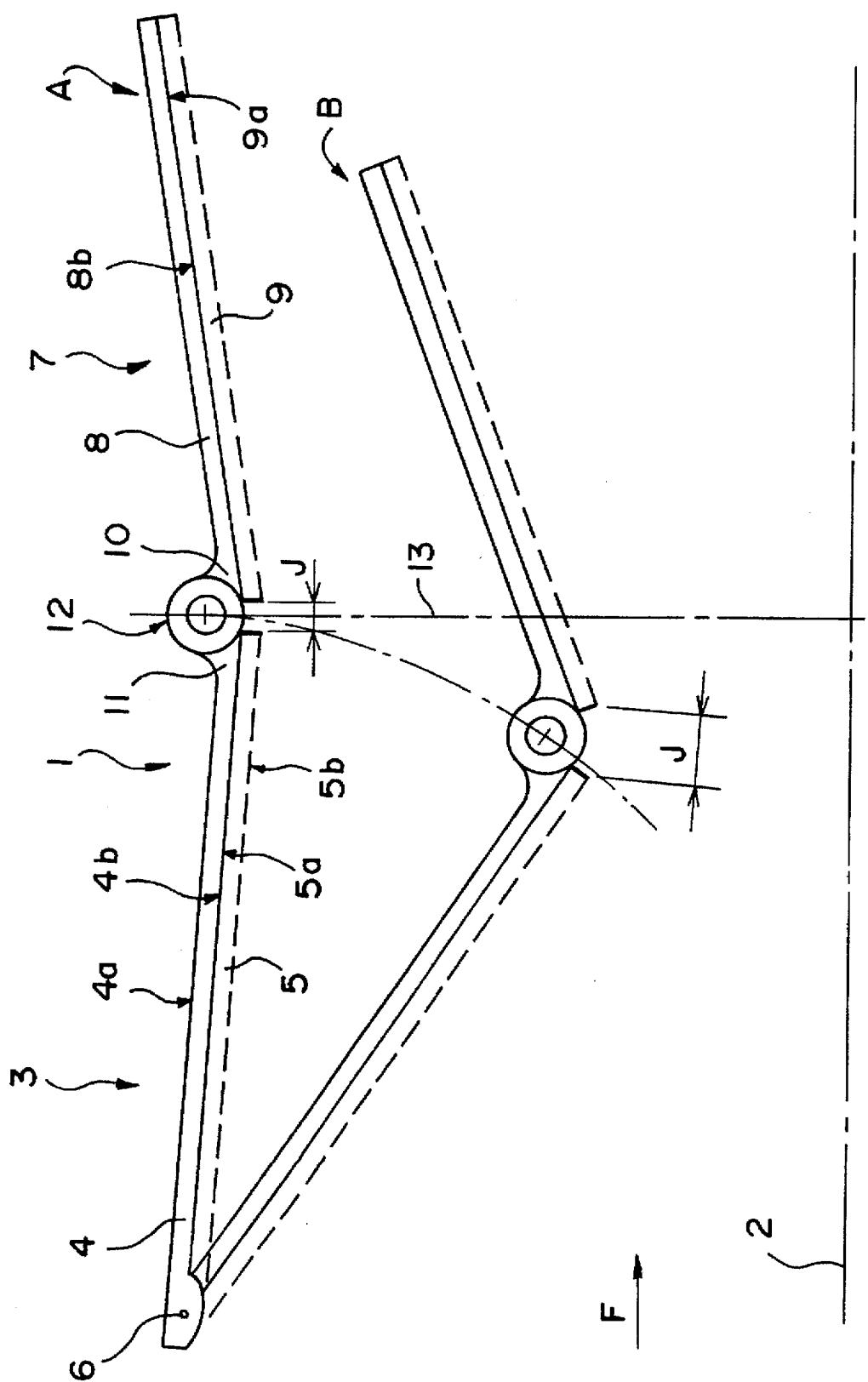
FIG. 1 is a longitudinal cross-sectional view schematically illustrating two nozzle flap positions.
Figure 2:
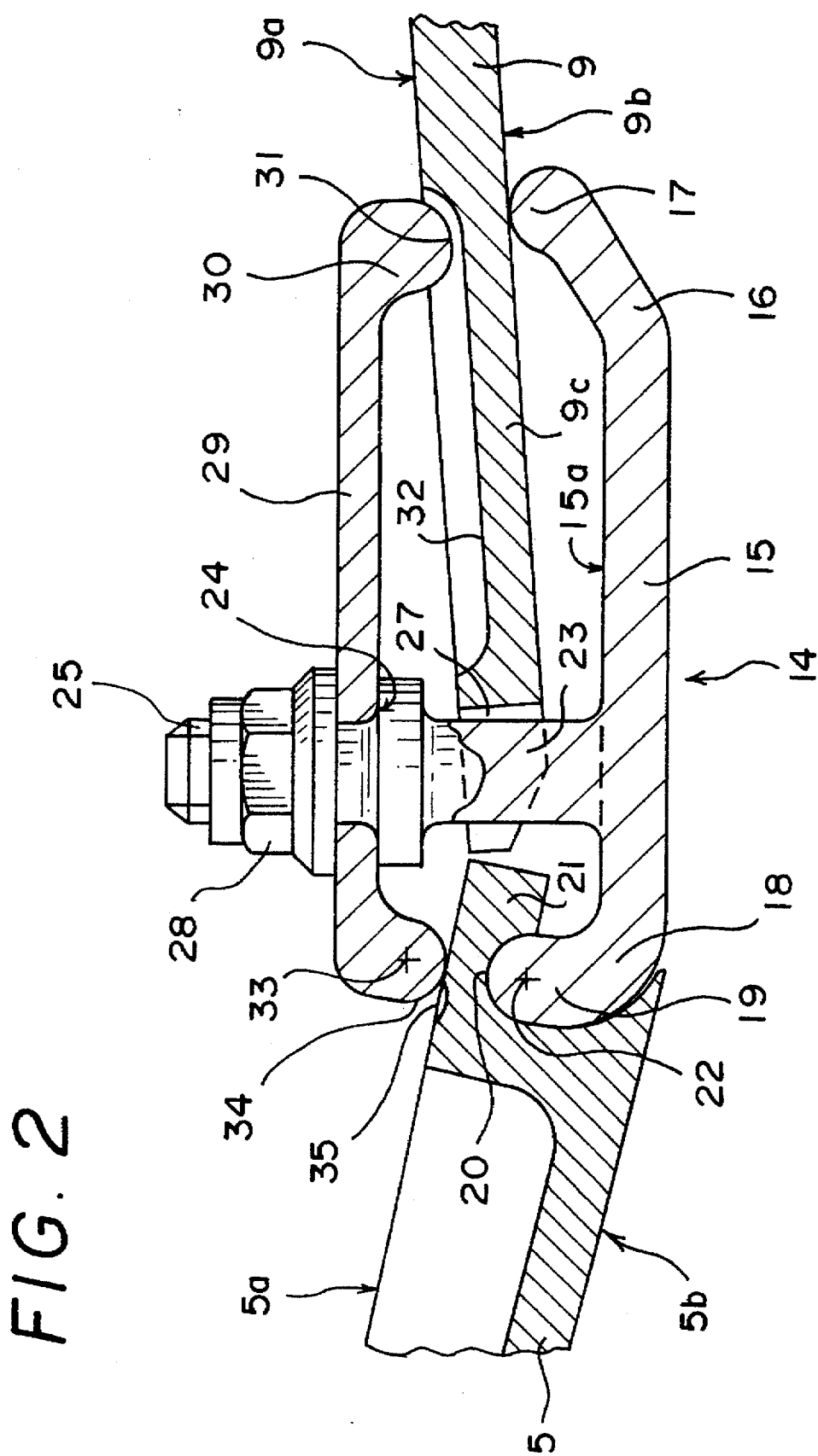
FIG. 2 is a cross-sectional view of the sealing device according to the present invention taken along a longitudinal plane of the nozzle.
Figure 3:
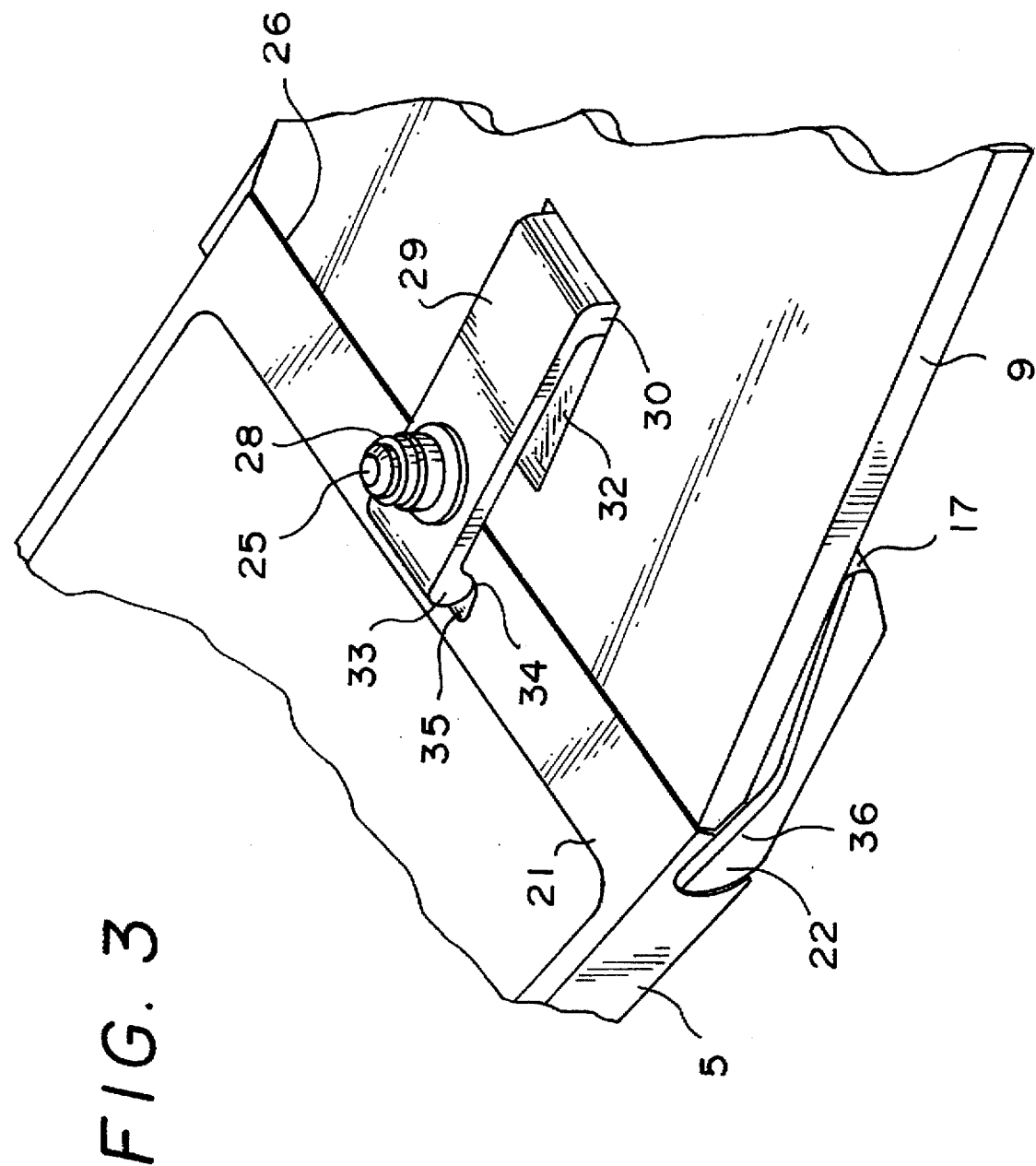
FIG. 3 is a partial, perspective view illustrating the sealing device according to the present invention.

FIG. 1 schematically illustrates a portion of a variable geometry nozzle which may be affixed to the rear of a turbojet engine (not shown) having a longitudinal axis 2. The terms "upstream" and "downstream" will be referred to relative to the direction of fluid flow through the nozzle indicated by arrow F which flows from an upstream direction to a downstream direction (from left to right as illustrated in FIG. 1). The variable geometry nozzle comprises a first ring 3 of upstream flaps which has a plurality of upstream controlled flaps 4 circumferentially spaced apart and which circumferentially alternate with upstream follower flaps 5. The upstream flaps 4 and 5 are pivotally attached at their upstream ends 6 to an end of the turbojet structure (not shown). The upstream controlled and follower flaps 4 and 5, respectively, have outer surfaces 4a and 5a facing away from the longitudinal axis 2 and inner surfaces 4b and 5b facing towards the axis 2.

The controlled flaps 4 are located on the outside of the upstream ring 3 and the follower flaps 5 are located on the inside of the upstream ring 3. Each follower flap 5 has its outer surface 5a adjacent to its opposite side edges bearing against the inner surface 4b of the two adjacent controlled flaps 4 so as to insure mutual sealing of the upstream flaps 4 and 5 against each other.

The exhaust nozzle 1 also comprises a second, downstream ring 7 of flaps located downstream of the first ring 3. The downstream ring 7 also comprises a plurality of downstream controlled flaps 8 which are circumferentially spaced apart about axis 2 and a plurality of downstream follower flaps 9 which extend between adjacent controlled flaps 8. Sealed hinge 12 pivotally connects the upstream edge portion 10 of each of the downstream controlled flaps 8 to a corresponding downstream edge portion 11 of an upstream controlled flap 4. Each downstream follower flap 9 also has an upstream edge portion that is pivotally connected to a downstream edge portion of a corresponding upstream follower flap 5.

As in the upstream ring 3, the downstream controlled flaps 8 of the downstream ring 7 are located outside of the downstream follower flaps 9 which are located on the inner portion of the downstream ring 7. The downstream follower flaps 9 have outer surfaces 9a adjacent to their opposite side edges which bear against corresponding inner surfaces 8b of adjacent downstream controlled flaps 8 to assure mutual sealing between the various flaps 8 and 9 of the downstream ring 7.

Sealing of the throat 13 of the exhaust nozzle 1, that is sealing the respective hinge means of the upstream controlled flaps 4 and the downstream controlled flaps 8, is ensured by the hinge means 12. Sealing the throat 13 of the nozzle 1 between the upstream follower flaps 5 and the downstream follower flaps 9 is achieved by a seal 14 extending between two associated follower flaps 5 and 9. The seal device, best illustrated in FIGS. 2-5, seals the clearance J present between corresponding upstream follower flaps 5 and downstream follower flaps 9. The clearance J varies depending upon the configuration of the nozzle 1, as illustrated in FIG. 1. This clearance is required to provide sealing between the side edges of the controlled flaps and the follower flaps of each of the flap rings 3 and 7. In FIG. 1, a first nozzle geometry A is illustrated in which the cross-sectional area of the throat 13 is large and the clearance J is comparatively slight. In the second nozzle configuration B, wherein the cross-sectional area of the throat 13 is small, the clearance J is comparatively large.

The seal 14 is mounted at the hinge between an upstream follower flap 5 and a corresponding downstream follower flap 9 and comprises a plate 15 which extends over at least the full circumferential width of the flaps 5 and 9. A downstream portion 16 of the plate 15 is bent outwardly relative to the longitudinal axis 2 and, at its downstream edge, has a first bead 17, with a generally circular cross-section, which makes sliding contact with the inner surface 9b of the downstream follower flap 9.

An upstream portion 18 of the plate 15 is also curved outwardly away from the axis 2 and has a second bead 19, also with a generally circular cross-sectional configuration, engaging a semi-cylindrical pivot recess 20 formed in the downstream edge portion 21 of the upstream follower flap 5. As illustrated, the pivot recess 20 opens generally inwardly toward the axis 2 and is formed in the downstream edge portion 21 of the upstream follower flap 5. The second bead 19 and the pivot recess 20 have cross-sectional contours such that the plate 15 is able to freely pivot about transverse axis 22 relative to the downstream edge portion 21 of the upstream follower flap 5 and to reliably seal this zone.

A stub 23 extends outwardly from the plate 15 and is located generally at the midpoint of the width of the plate 15. The stub 23 is located immediately downstream of the upstream follower flap 5 and has a shoulder 24 located outside of the follower flaps 5 and 9 relative to the axis 2 and a threaded end 25. The upstream edge portion 26 of the downstream follower flap 5 defines a notch 27 to freely accommodate the stub 23.

A locking bar 29 is connected to the stub 23 by nut 28 threaded onto the threaded end 25 of the stub 23. The locking bar 29 has a downstream end 30 with a surface 31 having a semi-circular cross-sectional configuration thereon which is located generally opposite to the first bead 17 of the plate 15 so as to clamp the upstream portion of the downstream follower flap 9 therebetween. The upstream portion 9c defines a longitudinal recess 32 located so as to be engaged by the surface 31.

The upstream end 33 of the locking bar 29 comprises a convex surface 34 having a generally cylindrical cross-sectional configuration which rests against a concave surface 35 formed on an outer surface 5a of the upstream follower flap 5. The concave surface 34 bears against the upstream follower flap 5 substantially opposite to the second bead 19.

The width of the plate 15 is at least equal to the width of the associated upstream and downstream flaps and is, preferably, slightly greater such that side walls 36 attached to each of the opposite sides of the plate 15 will extend along the corresponding opposite sides of the upstream and downstream follower flaps 5 and 9 to seal the transverse gap between the controlled flaps 4 and 8 and the follower flaps 5 and 9 in this zone.

In operation, the upstream and downstream controlled flaps 4 and 8 are moved by known actuators (not shown) in order to change the nozzle to a desired configuration appropriate to the desired operational flight mode. The pressures exerted by the fluid flowing through the nozzle 1 urge the upstream and downstream follower flaps 5 and 9, against the adjacent upstream and downstream controlled flaps 4 and 8. By this mechanism, along with the plates 15 urged against the downstream follower flaps 9 by the fluid forces, the gap between the upstream and downstream follower flaps 5 and 9 are reliably sealed. Relative to the upstream follower flaps 5, the plate 15 pivots about the pivot axis 22. The upstream portion of each downstream follower flap 9 is able to freely slide between the first bead 17 of the plate 15 and the convex surface 31 of the locking bar 29 in all configurations assumed by the exhaust nozzle 1. FIG. 1 illustrates the respective positions of the various components when the clearance J between the upstream and downstream follower flaps 5 and 9 is at a minimum. FIG. 4 illustrates the seal 14 when the nozzle I is in a converging-diverging configuration and while the clearance J is at a maximum. FIG. 5 illustrates the positions of the elements when the nozzle is in a converging-converging configuration and the clearance J is at an intermediate magnitude.

The foregoing description is provided for illustrative purposes only and should not be construed as in any way limiting this invention, the scope of C) which is defined solely by the appended claims.

We claim:

1. A variable geometry nozzle through which a fluid passes from an upstream to a downstream direction, the nozzle having a longitudinal axis and comprising:

a) a first ring of upstream flaps extending about the longitudinal axis and comprising a plurality of upstream controlled flaps circumferentially spaced apart around the longitudinal axis, and a plurality of upstream follower flaps, each upstream follower flap extending between adjacent spaced apart upstream controlled flaps, each upstream flap having an upstream portion pivotally connected to a structure and a downstream edge portion;

b) a second ring of downstream flaps extending about the longitudinal axis and comprising a plurality of downstream controlled flaps circumferentially spaced apart around the longitudinal axis and a plurality of downstream follower flaps, each downstream follower flap extending between adjacent spaced apart downstream controlled flaps, each downstream flap having an upstream edge portion;

c) a hinge mechanism pivotally connecting the downstream edge portion of each upstream controlled flap with the upstream edge portion of a downstream controlled flap; and d) a plurality of sealing devices, each sealing device comprising:

i) a plate extending between the downstream edge portion of an upstream follower flap and the upstream edge portion of a downstream follower flap and over at least the full width of the follower flaps in a circumferential direction, the plate having an upstream portion pivotally connected with the downstream edge portion of an upstream follower flap and a downstream portion having a first bead pivotally contracting the upstream edge portion of a downstream follower flap; and, ii) clamping means attached to the plate and cooperating with the first bead to clamp the upstream edge portion of a downstream follower flap so as to allow relative axial and pivotal movement between the downstream follower flap and the sealing device as the geometry of the nozzle changes wherein the dam in means comprises a stub extending from the plate; and a locking bar attached to the stub, the locking bar having a first convex surface bearing against a downstream follower flap generally opposite to the first bead; and e) a notch formed in the upstream edge portion of the downstream follower flap to accommodate the stub extending from the associated plate.

2. The variable geometry nozzle of claim 1 wherein the width of the plate is greater than the widths of the associated follower flaps and further comprising side walls located on opposite sides of the plate adjacent to corresponding sides of the associated follower flaps.

3. The variable geometry nozzle of claim 1 wherein the downstream portion of the plate has a downstream edge and wherein the first bead is located on the downstream edge.

4. The variable geometry nozzle of claim 1 further comprising a longitudinally extending recess formed in the upstream edge portion of the downstream follower flaps located so as to be engaged by the first convex surface of the locking bar.

5. The variable geometry nozzle of claim 4 wherein the longitudinally extending recess opens away from the longitudinal axis.

6. The variable geometry nozzle of claim 1 further comprising:

a) a pivot recess formed in the downstream edge portion of the upstream follower flap; and b) a second bead formed on an upstream edge of the plate and pivotally engaging the pivot recess.

7. The variable geometry nozzle of claim 6 wherein the locking bar further comprises an upstream end having a second convex surface bearing against the downstream edge portion of the upstream follower flap generally opposite to the second bead.

8. The variable geometry nozzle of claim 7 further comprising a concave recess formed in the downstream edge portion of the upstream follower flap located so as to be engaged by the second convex surface.

9. The variable geometry nozzle of claim 8 wherein the concave recess opens away from the longitudinal axis.

10. The variable geometry nozzle of claim 9 wherein the pivot recess opens toward the longitudinal axis.

11. A variable geometry nozzle through which a fluid passes from an upstream to a downstream direction, the nozzle having a longitudinal axis and comprising:

a) a first ring of upstream flaps extending about the longitudinal axis and comprising a plurality of upstream controlled flaps circumferentially spaced apart around the longitudinal axis, and a plurality of upstream follower flaps, each upstream follower flap extending between adjacent spaced apart upstream controlled flaps, each upstream flap having an upstream portion pivotally connected to a structure and a downstream edge portion;

b) a second ring of downstream flaps extending about the longitudinal axis and comprising a plurality of downstream controlled flaps circumferentially spaced apart around the longitudinal axis and a plurality of downstream follower flaps, each downstream follower flap extending between adjacent spaced apart downstream controlled flaps, each downstream flap having an upstream edge portion;

c) a hinge mechanism pivotally connecting the downstream edge portion of each upstream controlled flap with the upstream edge portion of a downstream controlled flap; and d) a plurality of sealing devices, each sealing device comprising:

i) a plate extending between the downstream edge portion of an upstream follower flap and the upstream edge portion of a downstream follower flap and over at least the full width of the follower flaps in a circumferential direction, the plate having an upstream portion pivotally connected with the downstream edge portion of an upstream follower flap and a downstream portion having a first bead pivotally contracting the upstream edge portion of a downstream follower flap; and, ii) clamping means attached to the plate and cooperating with the first bead to clamp the upstream edge portion of a downstream follower flap so as to allow relative axial and pivotal movement between the downstream follower flap and the sealing device as the geometry of the nozzle changes, wherein the clamping means comprises: a stub extending from the plate; and a locking bar attached to the stub, the locking bar having a first convex surface bearing against a downstream follower flap generally opposite to the first bead;

e) a pivot recess formed in the downstream edge portion of the upstream follower flap; and, f) a second bead formed on an upstream edge of the plate and pivotally engaging the pivot recess.

12. The variable geometry nozzle of claim 11 wherein the width of the plate is greater than the widths of the associated follower flaps and further comprising side walls located on opposite sides of the plate adjacent to corresponding sides of the associated follower flaps.

13. The variable geometry nozzle of claim 11 wherein the downstream position of the plate has a downstream edge and wherein the first bead is located on the downstream edge.

14. The variable geometry nozzle of claim 11 further comprising a longitudinally extending recess formed in the upstream edge portion of the downstream follower flaps located so as to be engaged by the first convex surface of the locking bar.

15. The variable geometry nozzle of claim 14 wherein the longitudinally extending recess opens away from the longitudinal axis.

16. The variable geometry nozzle of claim 11 further comprising a notch formed in the upstream edge portion of the downstream follower flaps to accommodate the stub extending from the associated plate.

17. The variable geometry nozzle of claim 11 wherein the locking bar further comprises an upstream end having a second convex surface bearing against the downstream edge portion of the upstream follower flap generally opposite to the second bead.

18. The variable geometry nozzle of claim 17 further comprising a concave recess formed in the downstream edge portion of the upstream follower flap located so as to be engaged by the second convex surface.

19. The variable geometry nozzle of claim 18 wherein the concave recess opens away from the longitudinal axis.

20. The variable geometry nozzle of claim 19 wherein the pivot recess opens toward the longitudinal axis.

* * * * *